United States Patent
Janakiraman et al.

(10) Patent No.: US 9,015,438 B2
(45) Date of Patent: Apr. 21, 2015

(54) SYSTEM AND METHOD FOR ACHIEVING ENHANCED PERFORMANCE WITH MULTIPLE NETWORKING CENTRAL PROCESSING UNIT (CPU) CORES

(71) Applicants: Ramsundar Janakiraman, Sunnyvale, CA (US); Prasad Palkar, Sunnyvale, CA (US); Brijesh Nambiar, Santa Clara, CA (US); Sridhar Kamsetty, San Jose, CA (US); Vijayaraghavan Doraiswami, Santa Clara, CA (US)

(72) Inventors: Ramsundar Janakiraman, Sunnyvale, CA (US); Prasad Palkar, Sunnyvale, CA (US); Brijesh Nambiar, Santa Clara, CA (US); Sridhar Kamsetty, San Jose, CA (US); Vijayaraghavan Doraiswami, Santa Clara, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 218 days.

(21) Appl. No.: 13/692,622

(22) Filed: Dec. 3, 2012

(65) Prior Publication Data
US 2014/0156954 A1 Jun. 5, 2014

(51) Int. Cl.
*G06F 12/00* (2006.01)
*G06F 9/52* (2006.01)
*H04L 12/54* (2013.01)

(52) U.S. Cl.
CPC ............. *G06F 9/526* (2013.01); *H04L 12/56* (2013.01)

(58) Field of Classification Search
None
See application file for complete search history.

(56) References Cited

U.S. PATENT DOCUMENTS

| 6,728,265 | B1 | 4/2004 | Yavatkar et al. |
|---|---|---|---|
| 7,624,263 | B1 | 11/2009 | Viswanath et al. |
| 2005/0105524 | A1 | 5/2005 | Stevens et al. |
| 2008/0095167 | A1 | 4/2008 | Bruss |
| 2010/0037311 | A1 | 2/2010 | He et al. |
| 2010/0172356 | A1 | 7/2010 | Tavares et al. |
| 2011/0292945 | A1 | 12/2011 | Yasuda |
| 2012/0057599 | A1 | 3/2012 | Yong |
| 2013/0246619 | A1* | 9/2013 | Raja et al. ............... 709/224 |
| 2013/0286846 | A1 | 10/2013 | Atlas et al. |

FOREIGN PATENT DOCUMENTS

WO 2011/019372 A2 2/2011

OTHER PUBLICATIONS

Non-Final Office Action in U.S. Appl. No. 13/918,748 dated Jan. 2, 2015. 13 pages.
Non-Final Office Action in U.S. Appl. No. 13/928,300 dated Nov. 5, 2014. 11 pages.

* cited by examiner

*Primary Examiner* — Brian Peugh
(74) *Attorney, Agent, or Firm* — Ying Wang

(57) ABSTRACT

The present disclosure discloses a method and network device for achieving enhanced performance with multiple CPU cores in a network device having a symmetric multiprocessing architecture. The disclosed method allows for storing, by each central processing unit (CPU) core, a non-atomic data structure, which is specific to each networking CPU core, in a memory shared by the plurality of CPU cores. Also, the memory is not associated with any locking mechanism. In response to a data packet is received by a particular CPU core, the disclosed system will update a value of the non-atomic data structure corresponding to the particular CPU core. The data structure may be a counter or a fragment table. Further, a dedicated CPU core is allocated to process only data packets received from other CPU cores, and is responsible for dynamically responding to queries receives from a control plane process.

23 Claims, 8 Drawing Sheets

FIRST FRAGMENT 400

SUBSEQUENT FRAGMENTS 460

... ...            ... ...

SYSTEM AND METHOD FOR ACHIEVING ENHANCED PERFORMANCE WITH MULTIPLE NETWORKING CENTRAL PROCESSING UNIT (CPU) CORES

FIELD

The present disclosure relates to networking processing performance. In particular, the present disclosure relates to a system and method for achieving enhanced performance with additional central processing unit (CPU) cores.

BACKGROUND

A symmetric multiprocessing (SMP) architecture generally is a multiprocessor computer architecture where two or more identical processors can connect to a single shared main memory. In the case of multi-core processors, the SMP architecture can apply to the CPU cores.

In an SMP architecture, multiple networking CPUs or CPU cores can receive and transmit network traffic. Typically, an atomic global counter is usually used across the multiple networking CPUs and/or networking CPU cores. This may slow down the performance of multiple processors or CPU cores. When the networking CPUs and/or CPU cores perform network packet processing, a large number of increments and decrements are performed on multiple counters by the multiple networking CPUs and/or CPU cores when the packets are received and transmitted or forwarded.

Moreover, it is possible that multiple CPUs try to access the same data structure in memory at the same time. This may cause certain indeterministic behaviors, including, for example, incorrect reading of data values, etc. Therefore, both the existing locking mechanism on the shared memory and the ability for multiple networking CPU cores to gain write access to the shared memory may degrade the performance of multiple networking CPUs and/or networking CPU cores in the SMP architecture.

In some scenarios, a network packet may be divided into multiple fragments. Each fragment may be received by the same or different network CPU or CPU cores. Because not all fragments include the necessary header information for packet processing, special handlings of such fragmented packets are needed by the network CPU or CPU cores.

BRIEF DESCRIPTION OF THE DRAWINGS

The present disclosure may be best understood by referring to the following description and accompanying drawings that are used to illustrate embodiments of the present disclosure.

DETAILED DESCRIPTION

Figure 1:
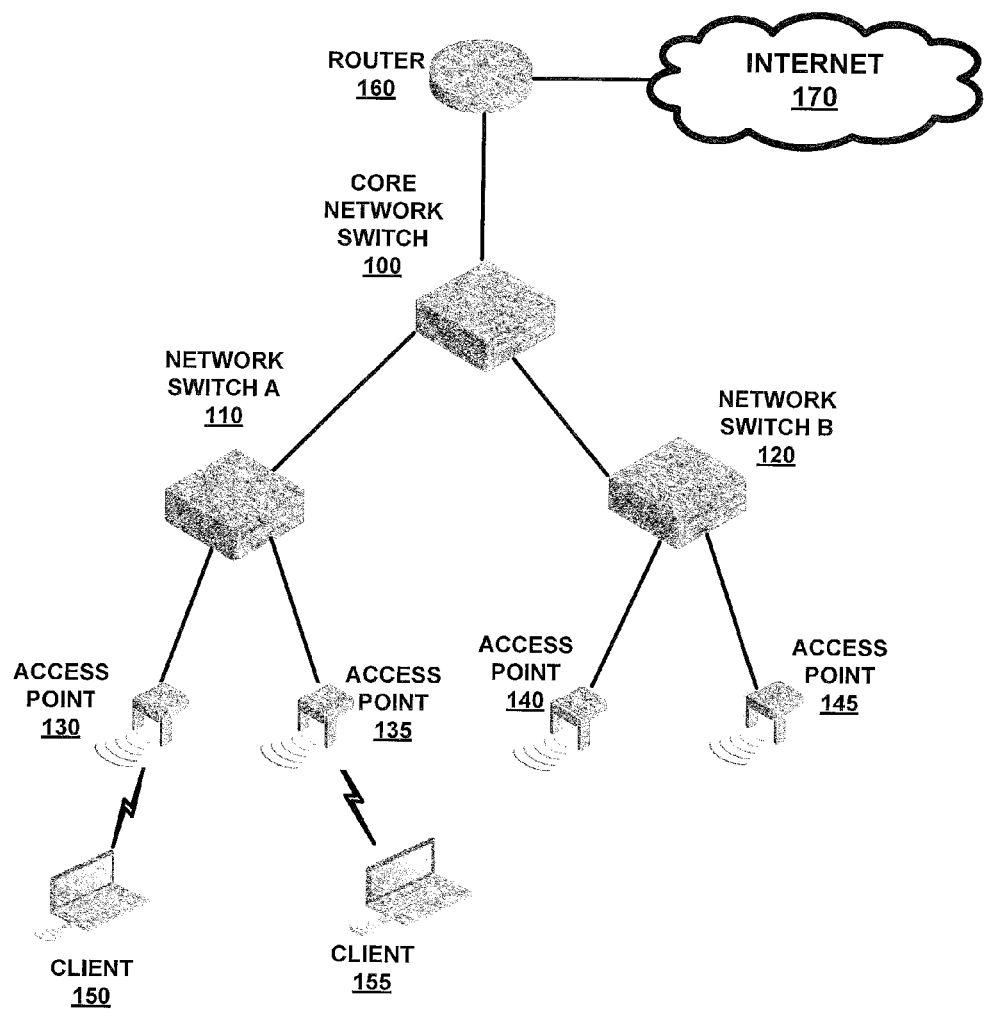
FIG. 1 is a diagram illustrating an exemplary wireless network environment according to embodiments of the present disclosure.

In the following description, several specific details are presented to provide a thorough understanding. While the context of the disclosure is directed to SMP architecture performance enhancement, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to networking processing performance. In particular, the present disclosure relates to a system and method for achieving enhanced performance with multiple networking central processing unit (CPU) cores. Specifically, the multiple CPU cores achieve enhanced performance by making it lockless a shared memory accessed by different CPU cores to access various forwarding tables.

According to embodiments of the present disclosure, the conventional locking mechanism on the shared memory is removed. A single CPU or CPU core is dedicated to handle all table management tasks with regard to tables in the shared memory. Any CPU or CPU core can access any table entries in the shared memory. The lockless design of the shared memory allow for a per-CPU or per-CPU core counter to be created to achieve enhanced performance with multiple networking CPU cores.

Specifically, instead of relying on a global atomic CPU counter, each networking CPU or CPU core maintains its own counter. Note that, these per-CPU or per-CPU-core counters are not atomic. Atomic operations are relatively expensive in terms of CPU time usage. The present disclosure allows for maintaining integrity of the networking CPU or CPU core counters without requiring creation of any atomic counter, because these networking CPU or CPU core counters are defined on a per-CPU basis. The per-CPU counters are generally defined as a regular data type, such as, unsigned integer, unsigned long, etc. Therefore, the data structure according to the present disclosure is much less expensive to implement than the single global atomic CPU counter commonly used before.

With the solution provided herein, a disclosed network device includes a dedicated networking CPU core, a plurality of networking CPU cores, a network interface to receive one or more data packets, and a memory whose access is shared by the dedicated networking CPU core and the plurality of networking CPU cores. The disclosed network device updates a value of the non-atomic data structure corresponding to a particular networking CPU core among the plurality of networking CPU cores if a data packet is received by the particular networking CPU core.

Furthermore, the memory includes a non-atomic data structure that is specific to each of the networking CPU cores. The non-atomic data structure may be a counter or a fragment table. Note that, the memory is not associated with any locking mechanism.

A dedicated networking CPU core in the symmetric multiprocessing architecture is allocated to process only data packets received from other networking CPU cores in the symmetric multiprocessing architecture. The dedicated networking CPU core can receive a query corresponding to one or more of the other networking CPU cores, identify one or more memory locations in the shared memory storing data for the one or more networking CPU cores corresponding to the query, retrieve one or more data values at the identified memory locations, and respond to the query based on the one or more retrieved data values. In some embodiments, the dedicated networking CPU core can further aggregate one or more retrieved data values to generate an aggregated data value, and respond to the query based on the aggregated data value.

In some embodiments, a particular networking CPU core among the plurality of networking CPU cores can determine that a value needed for processing a received data packet is not available in the memory, and forward the received data packet to the dedicated networking CPU core, thereby avoid using CPU core time on waiting for the value to become available. If the received data packet is fragmented, the particular networking CPU core can further determine whether one or more data fragments are received prior to their corresponding parent fragment. If not, the particular networking CPU core stores the data fragments until the parent fragment is received; and thereafter, continues processing data fragments based on header information in the parent fragment.

Computing Environment

FIG. 1 shows an exemplary wireless digital network environment according to embodiments of the present disclosure. FIG. 1 includes at least a core network switching device 100 and a number of other network switching and/or controlling devices, such as network switch A 110 and network switch B 120. Core network switching device 100 can be interconnected with the other network switching and/or controlling devices, such as, network switch A 110 and network switch B 120.

Network switch 100/110/120 is a computer networking device that connects network segments or network devices. Network switch 100, 110 or 120 may include a multi-port network bridge that processes and routes data at the data link layer (e.g., layer 2 of the OSI model), or switches that additionally process data at the network layer (e.g., layer 3 of the OSI model).

Furthermore, switch 100 can be connected to router 160, which can forward traffic to and receive traffic from Internet 170. Router 160 generally is a network device that forwards data packets between different networks, and thus creating an overlay internetwork. A router is typically connected to two or more data lines from different networks. When a data packet comes in one of the data lines, the router reads the address information in the packet to determine its destination. Then, using information in its routing table or routing policy, the router directs the packet to the next/different network. A data packet is typically forwarded from one router to another router through the Internet until the packet gets to its destination.

Moreover, assuming that a number of access points, such as access points 130 and 135, are interconnected with network switch A 110, and a number of access points, such as access points 140 and 145, are interconnected with network switch B 120. Each access points may be interconnected with zero or more client devices via either a wired interface or a wireless interface. In this example, for illustration purposes only, assuming that client 150 is associated with access point 130 via a wireless link, and client 155 is associated with access point 135 via a wireless link. Access point 130, 135, 140 or 145 generally refer to a network device that allows wireless clients to connect to a wired network. Access points usually connect to a router via a wired network or can be a part of a router in itself.

General Architecture

Figure 2:
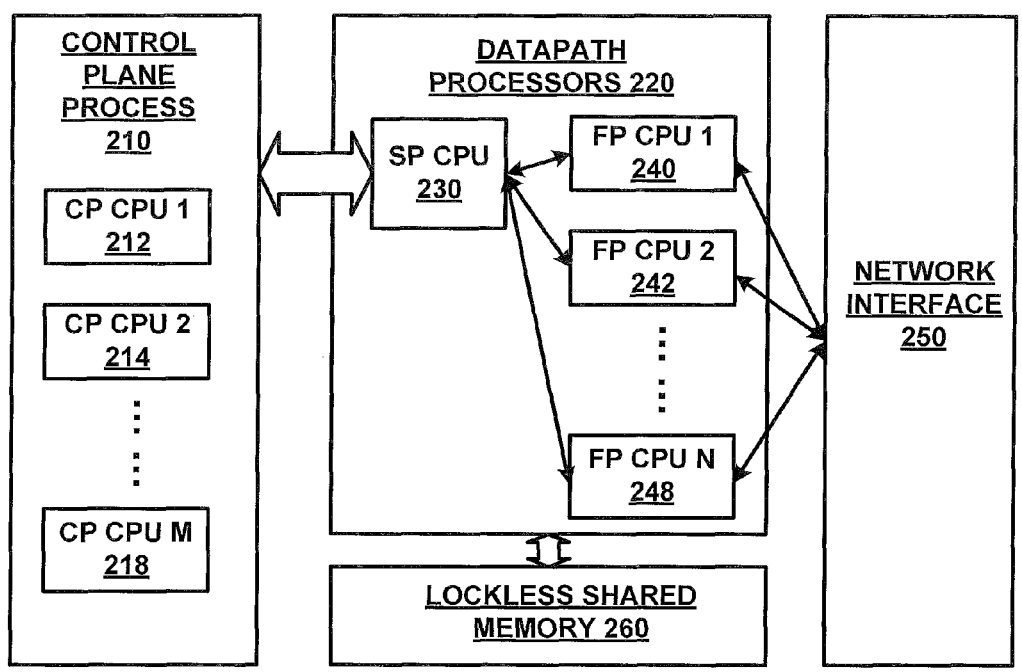
FIG. 2 illustrates exemplary architecture at multiple processing planes according to embodiments of the present disclosure.

FIG. 2 illustrates a general architecture including multiple processing planes according to embodiments of the present disclosure. Specifically, FIG. 2 includes at least a control plane process 210, two or more datapath processors 220, a lockless shared memory 260 accessible by the two or more datapath processors 220, and a network interface 250.

Control plane process 210 may be running on one or more CPU or CPU cores, such as CP CPU 1 212, CP CPU 2 214, . . . CP CPU M 218. Furthermore, control plane process 210 typically handles network control or management traffic generated by and/or terminated at network devices as opposed to data traffic generated and/or terminated at client devices.

According to embodiments of the present disclosure, datapath processors 220 include a single slowpath (SP) processor (e.g., SP CPU 230) and multiple fastpath (FP) processors (e.g., FP CPU 1 240, FP CPU 2 242, . . . FP CPU N 248). Only FP processors are able to receive data packets directly from network interface 250. SP processor, on the other hand, only receives data packets from FP processors.

Lockless shared memory 260 is a flat structure that is shared by all datapath processors 220, and not tied to any particular CPU or CPUs. Any datapath processor 220 can read any memory location within lockless shared memory 260. Therefore, both the single SP processor (e.g., SP CPU 230) and the multiple FP processors (e.g., FP CPU 1 240, FP CPU 2 242, . . . FP CPU N 248) have read access to lockless shared memory 260, but only the single SP processor (e.g., SP CPU 230) has write access to lockless shared memory 260. More specifically, any datapath processor 220 can have access to any location in lockless shared memory 260 in the disclosed system.

Also, control plane process 210 is communicatively coupled to slowpath (SP) CPU 230, but not fastpath (FP) processors (e.g., FP CPU 1 240, FP CPU 2 242, . . . FP CPU N 248). Thus, whenever control plane process 210 needs information from datapath processors 220, control plane process 210 will communicate with SP processor (e.g., SP CPU 230).

Symmetric Multiprocessing (SMP) Architecture

Symmetric Multiprocessing (SMP) generally refers to a computer architecture that provides fast performance by making multiple central processing units (CPUs) available to complete individual processes simultaneously. Unlike asymmetrical processing, any idle processor can be assigned any task, and additional CPUs can be added to improve performance and handle increased loads. A variety of specialized operating systems and hardware arrangements are available to support SMP. Specific applications can benefit from SMP if the code allows multithreading. It is important to note that SMP uses a single operating system and shares common memory and disk input/output resources. Therefore, multiple CPUs or CPU cores will likely be attempting to write to or read from the same memory location. Whenever there are multiple writers to the same memory location, it is important to ensure that the integrity of the data value at the memory location is intact.

Figure 3A:
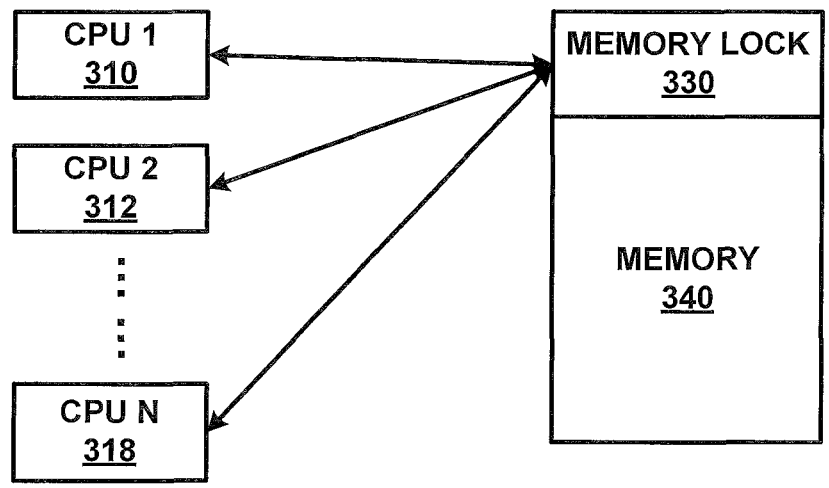
FIGS. 3A-3B illustrate exemplary SMP architectures according to embodiments of the present disclosure.

FIG. 3A illustrates an exemplary SMP architecture that is conventionally used. FIG. 3A includes at least a shared memory 340, a memory locking mechanism 330, and a number of CPUs or CPU cores, such as CPU 1 310, CPU 2

312, . . . CPU N 318. According to the SMP architecture illustrated in FIG. 3A, each of the CPU and/or CPU cores (e.g., CPU 1 310, CPU 2 312, . . . , CPU N 318) has the same read and write access to shared memory 340. In order to avoid multiple CPUs/CPU cores (e.g., CPU 1 310, CPU 2 312, . . . , CPU N 318) attempting to write to the same location in shared memory 340 at the same time and thus tampering the data, prior to performing the write operation, the executing CPU or CPU core needs to use memory locking mechanism 330 to lock the shared memory 340. Memory locking mechanism 330 ensures that only one CPU can write to shared memory 340 at any time.

In one embodiment, memory locking mechanism 330 includes a counter that can be incremented and/or decremented by the CPUs or CPU cores (e.g., CPU 1 310, CPU 2 312, . . . , CPU N 318) while they access shared memory 340. The counter is typically defined as an atomic data type, which allows the underlying operating system to verify the integrity of data values in shared memory 340 during simultaneous access from multiple CPUs or CPU cores. Atomic counter operations by the multiple CPUs and/or CPU cores collectively increase the performance cost and cause significant inefficiency in network computing.

Figure 3B:
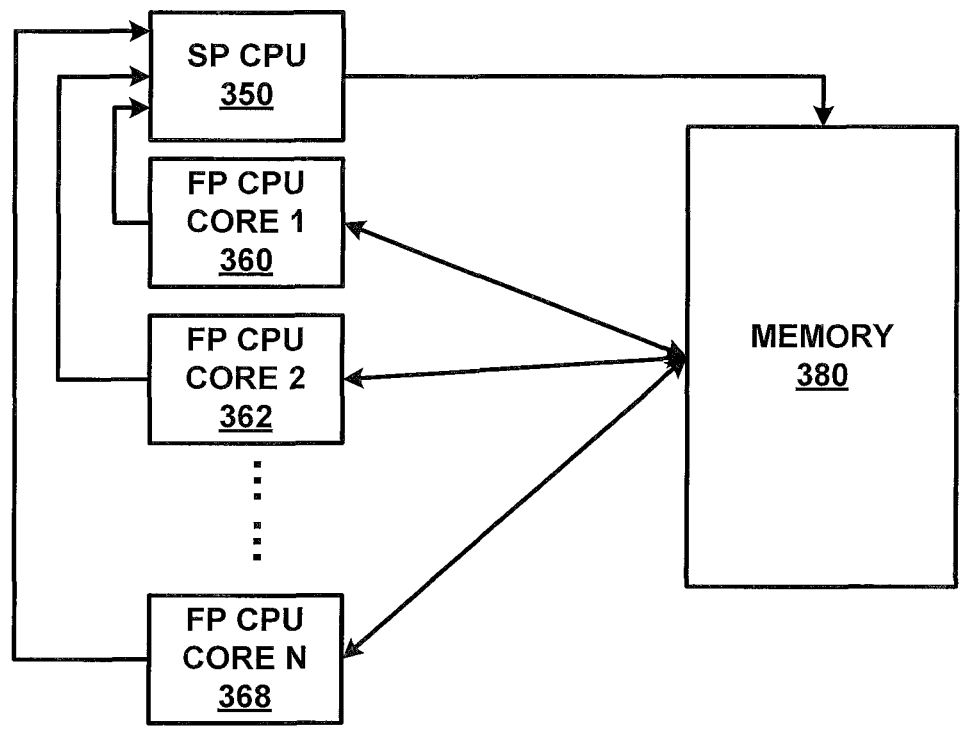

FIG. 3B illustrates an alternative SMP architecture according to embodiments of the present disclosure. FIG. 3B includes at least a shared memory 380, a single slowpath (SP) CPU or CPU core 350, and a number of fastpath (FP) CPUs or CPU cores, such as FP CPU core 1 360, FP CPU core 2 362, . . . FP CPU core N 368. Note that, both SP CPU/CPU core 350 and FP CPU/CPU cores 360-368 are data plane processors, which are primarily responsible for forwarding network data traffic. The data plane processors typically work in collaborate with control plane processors during operations as discussed in the previous section.

According to the SMP architecture illustrated in FIG. 3B, each of the FP CPU and/or CPU cores (e.g., FP CPU core 1 360, FP CPU core 2 362, . . . , FP CPU core N 368) has direct read access but no write access to shared memory 380. On the other hand, SP CPU 350 has exclusive write access to shared memory 380. The CPU cores and the shared memory are described in details in the following sections.

Multiple Networking Processing Cores

When an SMP architecture is used in software network traffic forwarding, multiple networking CPUs or CPU cores (e.g., FP CPU core 1 360, FP CPU core 2 362, . . . , FP CPU core N 368) can act as fastpath (FP) processors. If a FP processor receives a network packet, the FP processor tries to process the packet to completion. However, if any event occurs that threatens the completion of processing the packet by the FP processor, the FP processor will hand over the packet processing to the slowpath (SP) processor (e.g., SP CPU 350). For example, a packet usually goes through multiple pipelines, and often requires access to certain table entries in each pipeline. If one of the table entries is missing for processing of the packet, the FP processor (e.g., FP CPU Core 1 360) will pass the processing of the packet to SP processor (e.g., SP CPU 350) and continue processing the incoming packets. Thus, FP processors by definition handle "fast" packet processing, which means they do not block themselves and wait for other components or modules during the processing of network packets. Any packets requiring special handling or wait by a CPU or CPU core will be handed over to a dedicated CPU or CPU core, namely the SP processor (e.g., SP CPU 350).

The SP processor (e.g., SP CPU 350) is a single dedicated CPU or CPU core that typically handles table managements. Note that, the SP processor only receives packets from FP processors. The SP processor does not receive packets directly from any line cards or network interfaces, and only the plurality of FP CPUs or CPU cores can send packets to the SP CPU 350.

It is important to note that, in this embodiment, there is no locking mechanism associated with shared memory 380, because only the SP processor (e.g., SP CPU 350) has the write access to shared memory 380, which will not cause any data integrity issues.

Moreover, instead of an atomic counter accessible by multiple CPUs or CPU cores, each CPU or CPU core maintains a counter. The counter is defined as a regular data type, for example, unsigned integer, unsigned long long, etc., in lieu of an atomic data type. A per-CPU or per-CPU core counter also helps to eliminate the need for any locking mechanism for shared memory 380.

A typical pipeline process at a FP processor involves one or more of the following operations:
  Port lookup;
  VLAN lookup;
  Port-VLAN table lookup;
  Bridge table lookup;
  Firewall session table lookup;
  Route table lookup;
  Packet encapsulation;
  Packet encryption;
  Packet decryption;
  Tunnel de-capsulation; and/or
  Forwarding; etc.

Lockless Shared Memory

Shared memory 380 can be used to store a variety of tables to assist software network packet forwarding. For example, the tables may include, but are not limited to, a bridge table, a session table, a user table, a station table, a tunnel table, a route table and/or route cache, etc.

Multiple tables in shared memory 380 can be accessed by multiple FP processors (e.g., FP CPU core 1 360, FP CPU core 2 362, . . . , FP CPU core N 368) while the FP processors are processing packets received one or more network interfaces. If the FP processor determines that a packet requires any special handlings, the FP processor will hand over the packet processing to the SP processor. For example, the FP processor may find a table entry corresponding to the packet is missed; and therefore, handing over the packet processing to the SP processor. As another example, the FP processor may find that the packet is a fragmented packet, and thus hand over the packet processing to the SP processor.

Fragmented Data Packets

Figure 4:
FIG. 4 is a diagram illustrating an exemplary fragmented network packet according to embodiments of the present disclosure.
Figure 4:
Figure 4:

FIG. 4 illustrates an exemplary fragmented packet according to embodiments of the present disclosure. The packet includes multiple portions, including at least a first fragment (or a parent fragment) 400, and one or more subsequent fragments (or data fragments) 460. First fragment 400 includes at least a network layer (layer 3 or L3) header 410, a transport layer (layer 4 or L4) header 420, and payload 430. Subsequent fragments 460 include at least a network layer (layer 3 or L3) header 440 and payload 450.

Note that, subsequent fragments 460 do not include any transport (layer 4 or L4) header. Transport (layer 4 or L4) header 420 is required for session processing, for example, when firewall policies need to be applied to the packet. Even though subsequent fragments 460 do not include any transport (layer 4 or L4) header, they typically still need to go through the same firewall. That is, the same firewall policies applied to first segment 400 shall also be applied to any subsequent fragments 460 based on transport (layer 4 or L4) header 420 contained in first fragment 400 of the packet.

In some embodiments, first fragment 400 is sent prior to subsequent data fragments 460 by the packet sender. However, these fragments may be received out of order by the same or different FP processors. In other embodiments, the packet sender may send data fragments 460 prior to sending parent fragment 400, because the packet sender is allowed to send different fragments of a fragmented packet out of order.

In order to perform session processing on subsequent fragments 460, the disclosed system can queue such subsequent fragments 460, for example, in a fragment table in shared memory by the SP processor until first fragment 400 corresponding to the same packet is received, for example, by the SP processor. Once first fragment 400 is received by the SP processor, the disclosed system will apply firewall policies to all queued fragments and remove these queued fragments from the queue.

In a high-throughput use scenario, using a single SP processor to handle all of the fragment processing is likely to create a performance bottleneck. Alternatively, instead of one CPU or CPU core handling the queuing of different packet fragments from multiple FP CPU or CPU cores, fragment processing can be distributed to the multiple FP CPU or CPU cores. This relieves the single SP processor from becoming the bottleneck during the processing of fragmented packets in a high-throughput scenario, for example, when the system is configured to handle over 40 Gigabit data traffic throughputs.

Moreover, if data fragments are processed by the single SP processor, every time when a data fragment is received, a temporary session entry is created in the session table corresponding to the subsequent data fragment, such that the subsequent data fragment can be processed using the temporary session entry in the FP CPU or CPU cores. This can potentially results in a large number of session entries in the session table just for the handling of packet fragments.

On the other hand, if the fragment processing is offloaded to multiple FP processors, each FP CPU or CPU cores maintains a data structure such as a fragment table. Thus, each fragment table is specific to its corresponding FP CPU or CPU core. The FP CPU or CPU core, upon receiving a data fragment without information necessary for session processing (e.g., a transport layer header), will queue the data fragment in its own fragment table, instead of handing the fragment over to the SP processor. The FP CPU or CPU core will perform various fragment table management tasks. Note that, for a given data flow, the disclosed system ensures that all fragments will be received by the same FP CPU or CPU core. Thus, all data fragments from the same packet will be queued in the same fragment table by the same FP CPU or CPU core. When the FP CPU or CPU core receives the first fragment of the same packet, the FP CPU or CPU core will perform session processing on the queued data fragments based on the header information (e.g., transport layer (L4) header) in the first fragment, and remove these subsequent data fragments from the fragment table and re-insert the fragments to continue the forwarding pipeline.

Counter Management

As described in previous section regarding SMP architecture, each CPU or CPU core in the SMP architecture can maintain a separate non-atomic counter of regular data type. When a FP CPU or CPU core receives a packet, it may increment or decrement the values of the counters to reflect network traffic information, including but not limited to, the number of received frames, the number of received bytes, error conditions and/or error counts, etc. Each FP CPU or CPU core maintains its own copy of the aforementioned counters, no locking mechanism is needed. Nor are the counters needed to be defined as an atomic data type. The values of the per-CPU counters are stored in the shared memory.

Periodically, a control plane (CP) process, which can be run on one or more control plane processors, may inquire a particular counter (or counters) at a particular FP CPU or CPU core (or FP CPU/CPU cores), for example, to find out how many packets have been processed by the particular FP CPU or CPU core (or FP CPU/CPU cores). Accordingly, the CP process may send a query to the SP processor. The query may include one or more identifiers to identify the FP processors whose counters are inquired upon. Also, the query may include information identifying a subset of counter values that the CP process inquires.

Subsequently, the SP processor will access the data location in the shared memory that contains the counter value(s) corresponding to the particular FP CPU or CPU core and the inquired counter(s) based on the query received from the CP process. Even though the counters are incremented and decremented by the FP CPUs or CPU cores, because the architecture allows any datapath processor to access lockless shared memory, the SP processor can directly access the FP CPU counter values without forwarding the query from CP process to FP processors. The SP processor can determine the address/location corresponding to a specific FP CPU or CPU core in the shared memory based on the CPU identifier in the received query.

In some embodiments, when counter information from multiple FP CPU or CPU cores are inquired by the CP process, the SP processor may also aggregate the values of the counters from multiple FP CPU or CPU cores after retrieving each individual counter values, and return the aggregated value to the CP process in response to the received query.

In some embodiments, the query from the CP process may inquire a specific counter value from all of the CPUs without identifying any specific CPUs or CPU cores in the query. The SP processor will then access counter values corresponding to each and every FP CPU or CPU cores in the system, aggregate the counter values, and return the aggregated counter value to the CP process. Note that, the CPU identifier may be received either from a user or from a CP process. The command line interface of the disclosed system allows for structuring the query in a very flexible manner to include one or more counters corresponding to a single FP CPU or CPU core, a subset or all of the FP CPUs or CPU cores, etc.

Processes for Achieving Enhanced Performance with Multiple Network CPU Cores

Figure 5A:
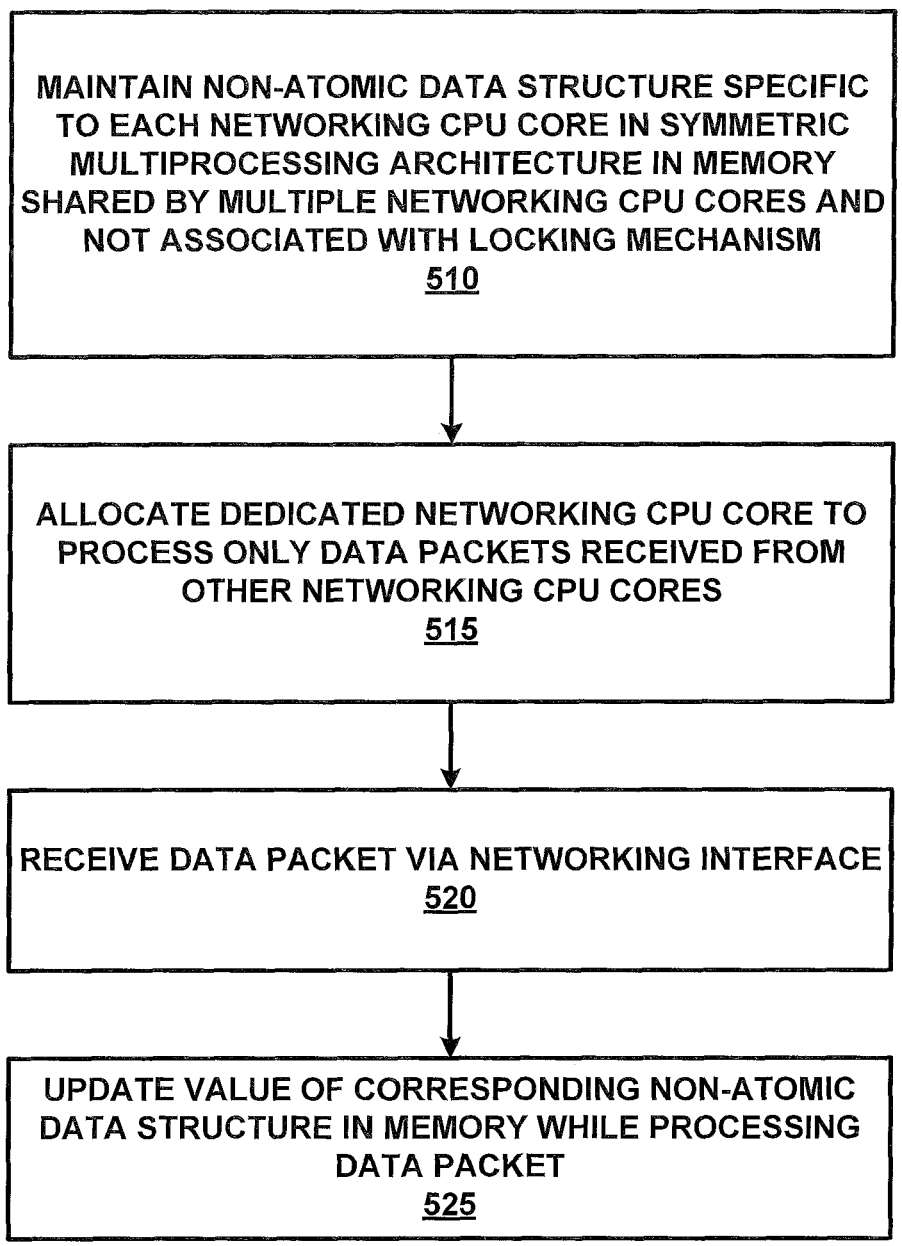
FIGS. 5A-5C are flowcharts illustrating processes for achieving enhanced performance with multiple networking central processing unit (CPU) cores according to embodiments of the present disclosure.
Figure 5B:
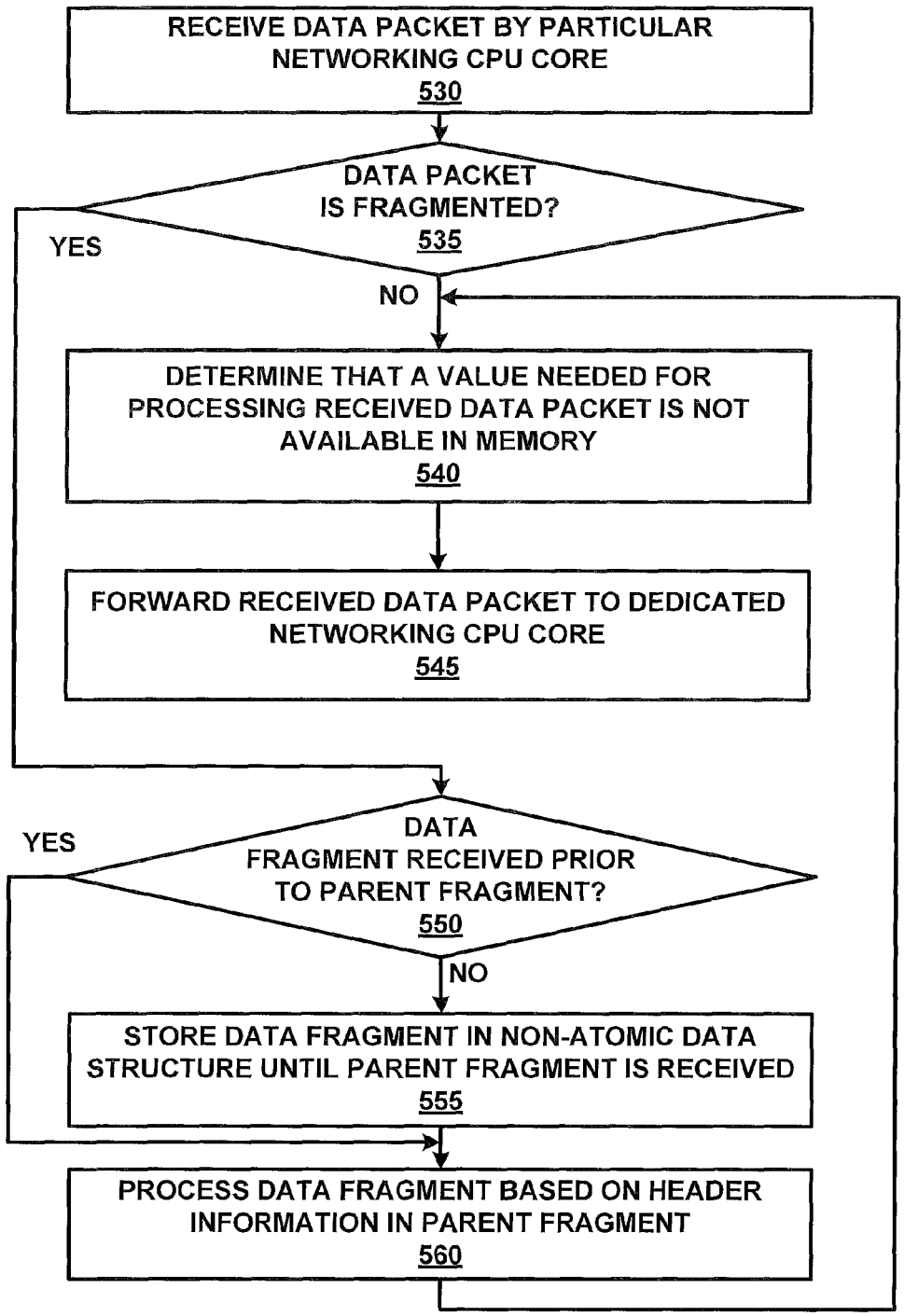
Figure 5C:
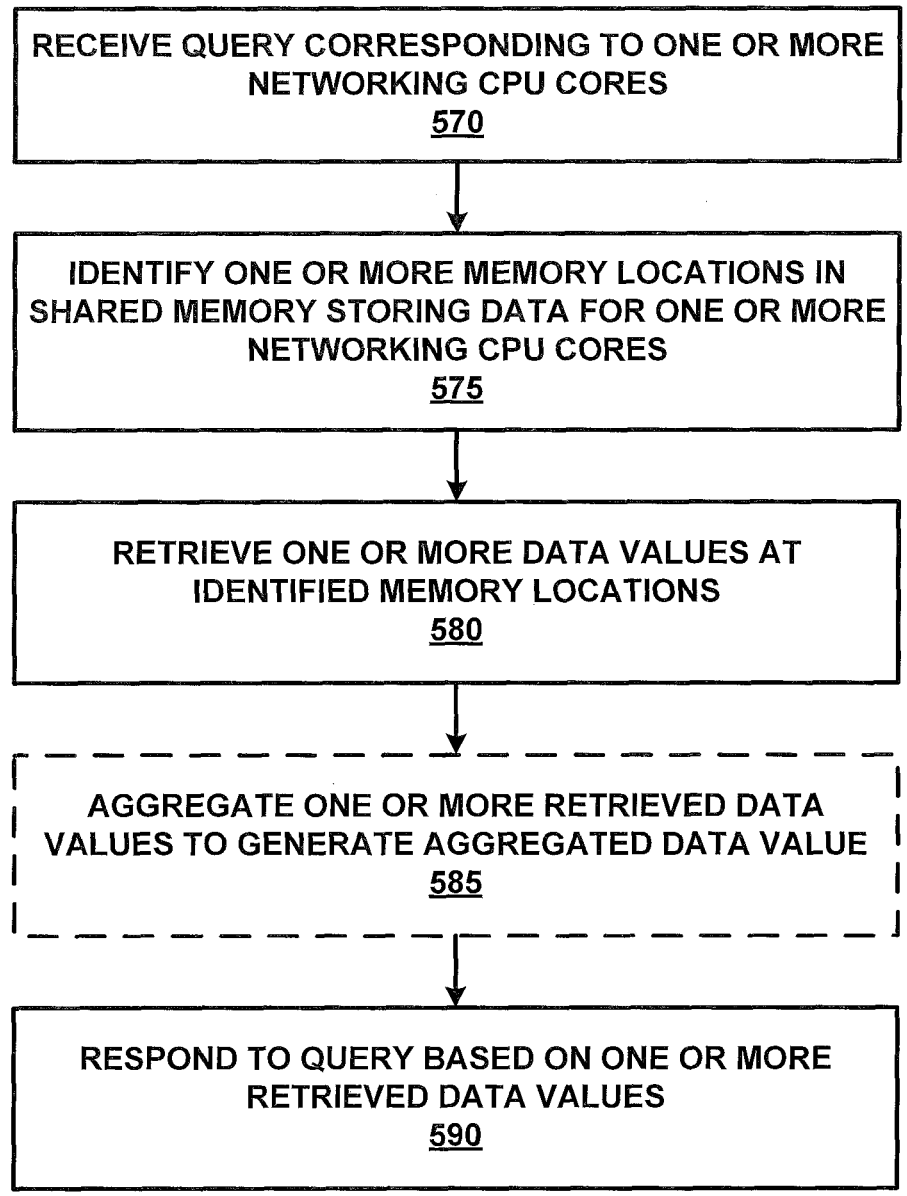

FIGS. 5A-5C are flowcharts illustrating exemplary processes for achieving enhanced performance with multiple CPU cores. Specifically, FIG. 5A illustrates an exemplary process by the SMP architecture at a high level. During operation, the disclosed system maintains a non-atomic data structure, which is specific to each networking CPU core in the SMP architecture, in a memory that is shared by multiple networking CPU cores and that is not associated with any locking mechanism (operation 510). Furthermore, the disclosed system allocates a dedicated networking CPU core to process only data packets received from other networking CPU cores (operation 515). At any time, the disclosed system may receive a data packet via a networking interface (operation 520). The disclosed system will update, e.g., increment or decrement, a value corresponding to the non-atomic data structure in the shared memory while processing the received data packet (operation 525).

FIG. 5B illustrates an exemplary process by networking CPU cores such as fastpath (FP) processors in the SMP architecture according to embodiments of the present disclosure.

During operation, a particular networking CPU core receives a data packet (operation 530). The particular networking CPU core then determines whether the data packet is fragmented (operation 535). If so, the particular networking CPU core further determines whether one or more data fragments are received prior to their corresponding parent fragment (operation 550). If not, the particular networking CPU core continues to operation 560. And if so, the particular networking CPU core stores the data fragments in the non-atomic data structure (such as a fragment table) until the parent fragment is received (operation 555). Thereafter, the particular networking CPU core will continue processing data fragments based on header information (e.g., transport layer or L4 header information) in the parent fragment (operation 560).

On the other hand, if the particular networking CPU core determines that the data packet is not fragmented at operation 535 or after the particular networking CPU core completes processing data fragments based on header information at operation 560, the particular networking CPU core may further determine that a value needed for processing received data packet (or data packet fragment) is not available in the shared memory (operation 540). In that case, the particular networking CPU core will forward the received data packet to a dedicated networking CPU core for further process (operation 545).

FIG. 5C illustrates an exemplary process by a dedicated networking CPU core such as a slowpath (SP) processor in the SMP architecture according to embodiments of the present disclosure. Specifically, the dedicated networking CPU core first receives a query corresponding to one or more networking CPU cores, e.g. fastpath (FP) CPU cores (operation 570). Next, the dedicated networking CPU core identifies one or more memory locations in the shared memory storing data for the one or more networking CPU cores corresponding to the query (operation 575). Further, the dedicated networking CPU core retrieves one or more data values at the identified memory locations (operation 580). In some embodiments, the dedicated networking CPU core can further aggregate one or more retrieved data values to generate an aggregated data value (operation 585). Subsequently, the dedicated networking CPU core responds to the query based on the one or more retrieved data values (operation 590). Note that, if the dedicated networking CPU core generates an aggregated data value, it may respond to the query based on the aggregated data value.

System for Achieving Enhanced Performance with Multiple Network CPU Cores

Figure 6:
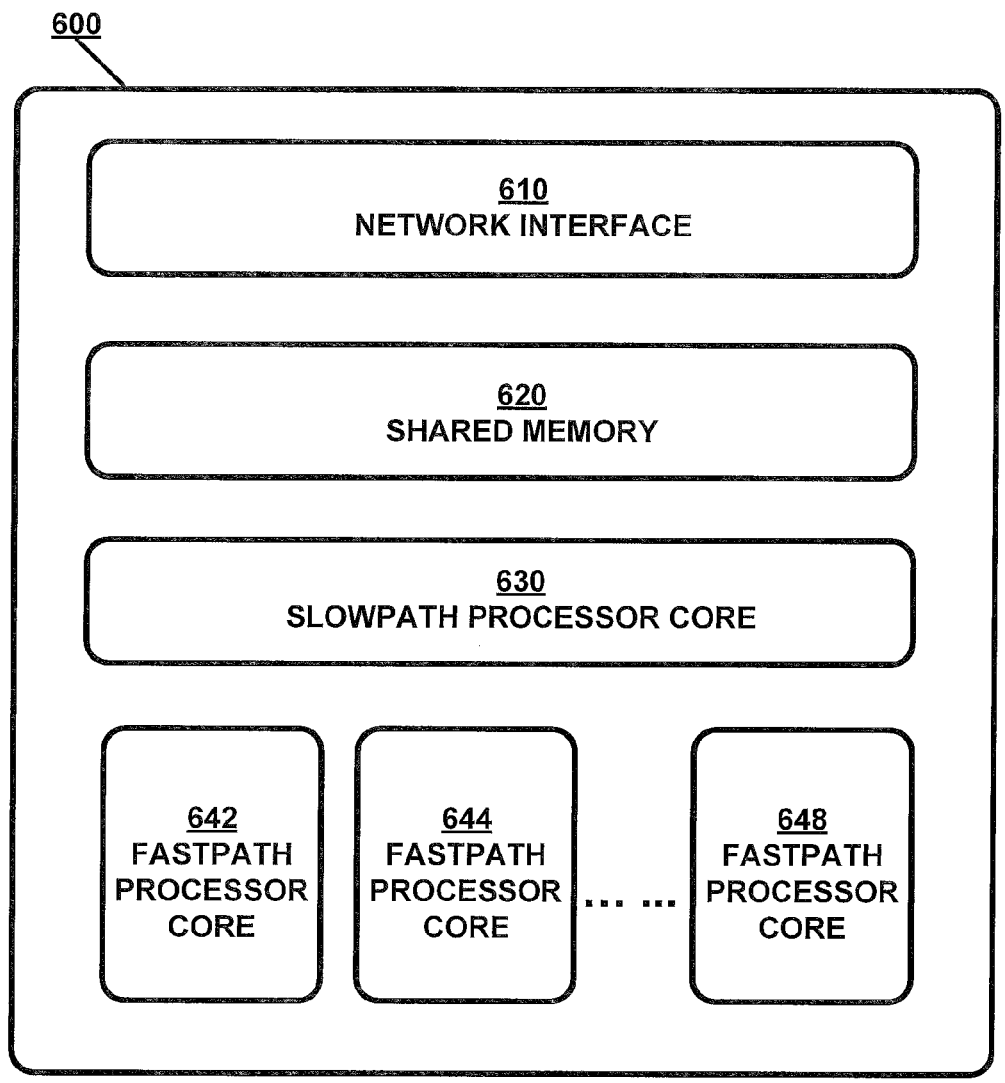
FIG. 6 is a block diagram illustrating a system of achieving enhanced performance with multiple networking central processing unit (CPU) cores according to embodiments of the present disclosure.

FIG. 6 is a block diagram illustrating a network device system for home VLAN identification for roaming mobile clients according to embodiments of the present disclosure. Network device 600 includes at least a network interface 610 capable of communicating to a wired network, a shared memory 620 capable of storing data, a slowpath processor core 630 capable of processing network data packets, and one or more fastpath processor cores, including fastpath processor core 642, fastpath processor core 644, . . . , fastpath processor core 648, which are capable of processing network data packets. Moreover, network device 600 may be used as a network switch, network router, network controller, network server, etc. Further network device 600 may serve as a node in a distributed or a cloud computing environment.

Network interface 610 can be any communication interface, which includes but is not limited to, a modem, token ring interface, Ethernet interface, wireless IEEE 802.11 interface (e.g., IEEE 802.11n, IEEE 802.11ac, etc.), cellular wireless interface, satellite transmission interface, or any other interface for coupling network devices. In some embodiments, network interface 610 may be software-defined and programmable, for example, via an Application Programming Interface (API), and thus allowing for remote control of the network device 600.

Shared memory 620 can include storage components, such as, Dynamic Random Access Memory (DRAM), Static Random Access Memory (SRAM), etc. In some embodiments, shared memory 620 is a flat structure that is shared by all datapath processors (including, e.g., slow path processor core 630, fastpath processor core 642, fastpath processor core 644, . . . , fastpath processor core 648, etc.), and not tied to any particular CPU or CPU cores. Any datapath processor can read any memory location within shared memory 620. Shared memory 620 can be used to store various tables to assist software network packet forwarding. For example, the tables may include, but are not limited to, a bridge table, a session table, a user table, a station table, a tunnel table, a route table and/or route cache, etc. It is important to note that there is no locking mechanism associated with shared memory 620. Any datapath processor can have access to any location in lockless shared memory in network device 600.

Slowpath processor core 630 typically includes a networking processor core that is capable of processing network data traffic. Slowpath processor core 630 is a single dedicated CPU core that typically handles table managements. Note that, slowpath processor core 630 only receives data packets from one or more fastpath processor cores, such as fastpath processor core 642, fastpath processor core 644, . . . , fastpath processor core 648. In other words, slowpath processor core 630 does not receive data packets directly from any line cards or network interfaces. Only the plurality of fastpath processor cores can send data packets to slowpath processor core 630. Moreover, slowpath processor core 630 is the only processor core having the write access to shared memory 620, and thereby will not cause any data integrity issues even without a locking mechanism in place for shared memory 620.

Fastpath processor cores 642-648 also include networking processor cores that are capable of processing network data traffic. However, by definition, fastpath processor cores 642-648 only performs "fast" packet processing. Thus, fastpath processor cores 642-649 do not block themselves and wait for other components or modules during the processing of network packets. Any packets requiring special handling or wait by a processor core will be handed over by fastpath processor cores 642-648 to slowpath processor core 630.

Each of fastpath processor cores 642-648 maintains one or more counters. The counters are defined as a regular data type, for example, unsigned integer, unsigned long long, etc., in lieu of an atomic data type. When a fastpath processor core 642-648 receives a packet, it may increment or decrement the values of the counters to reflect network traffic information, including but not limited to, the number of received frames, the number of received bytes, error conditions and/or error counts, etc. A typical pipeline process at fastpath processor cores 642-648 includes one or more of: port lookup; VLAN lookup; port-VLAN table lookup; bridge table lookup; firewall session table lookup; route table lookup; packet encapsulation; packet encryption; packet decryption; tunnel de-capsulation; forwarding; etc.

Moreover, fastpath processor cores 642-648 each can maintain a fragment table. Upon receiving a data fragment without information necessary for session processing (e.g., a transport layer or L4 header), fastpath processor cores 642-648 will queue the data fragments in their own fragment table, and perform various fragment table management tasks. When a fastpath processor core 642-648 receives the first fragment of the same packet, the fastpath processor core 642-648 will perform session processing on the queued data fragments based on the header information (e.g., transport layer or L4 header) in the first fragment, and remove these data fragments from the fragment table.

Periodically, slowpath processor core 630 may receive a query corresponding to one or more fastpath processor cores 642-648 from a control plane process. Slowpath processor core 630 identifies one or more memory locations in the shared memory storing data for the one or more fastpath processor cores 642-648 corresponding to the query, retrieves one or more data values at the identified memory locations, and responds to the query. In some embodiments, slowpath processor core 630 can further aggregate retrieved data values to generate an aggregated data value, and respond to the query based on the aggregated data value.

According to embodiments of the present disclosure, network services provided by network device 600, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A method comprising:
   maintaining, by each central processing unit (CPU) core in a network device having symmetric multiprocessing architecture comprising a plurality of CPU cores, a data structures that are specific to each of the CPU core, in a memory shared by the plurality of CPU cores; and in response to receiving a data packet by a particular CPU core, the particular CPU core updating a value of the data structure corresponding to the particular CPU core without using any locking mechanism.

2. The method of claim 1, wherein any memory location in the shared memory is accessible to any of the CPU cores, and wherein the memory is not associated with any atomic data locking mechanism.

3. The method of claim 1, wherein the data structure comprises one or more of:
   a counter that comprises information on one or more of a number of received frames, a number of received bytes, an error condition, and an error count; and
   a fragment table that includes at least one or more fragments without any transport layer header.

4. The method of claim 1, further comprising:
   allocating a dedicated CPU core in the network device having the symmetric multiprocessing architecture to process only data packets received from other CPU cores in the network device having the symmetric multiprocessing architecture.

5. The method of claim 4, further comprising:
   determining, by the particular CPU core, that a value needed for processing a received data packet is not available in the shared memory; and
   forwarding, by the particular CPU core, the received data packet to the dedicated CPU core, thereby avoid using CPU core time on waiting for the value to become available.

6. The method of claim 4, further comprising:
   receiving, by the dedicated CPU core, a query corresponding to one or more of the other CPU cores;
   identifying, by the dedicated CPU core, one or more memory locations in the shared memory storing data for the one or more CPU cores corresponding to the query;
   retrieving, by the dedicated CPU core, one or more data values at the identified memory locations; and
   responding, by the dedicated CPU core, to the query based on the one or more retrieved data values.

7. The method of claim 6, further comprising:
   aggregating, by the dedicated CPU core, the one or more retrieved data values to generate an aggregated data value; and
   responding, by the dedicated CPU core, to the query based on the aggregated data value.

8. The method of claim 6, wherein the query is received from a control plane process that runs on one or more of control plane CPU cores.

9. The method of claim 8, wherein the query is generated by either a user through a command line interface to the control plane process or generated by the control plane process.

10. The method of claim 1, wherein the data packet comprises a parent fragment and a plurality of data fragments, and wherein session processing information is included only in the parent fragment and absent in the plurality of data fragments.

11. The method of claim 10, further comprising:
    in response to receiving a data fragment of the data packet prior to the corresponding parent fragment of the data packet, storing the data fragment in the non-atomic data structure until the corresponding parent fragment of the data packet is received; and
    continuing processing the data fragment based on a transport layer header in the corresponding parent fragment.

12. A network device having a symmetric multiprocessing architecture, the network device comprising:
    a dedicated CPU core;
    a plurality of CPU cores;
    a network interface to receive one or more data packets;
    a memory whose access is shared by the dedicated CPU core and the plurality of CPU cores,
    wherein the memory comprises data structure that are specific to each of the CPU cores, and
    wherein a value of the data structure corresponding to a particular CPU core among the plurality of CPU cores is updated by the particular CPU core without using any locking mechanism in response to receiving a data packet by the particular CPU core.

13. The network device of claim 12, wherein any memory location in the memory is accessible to any of the dedicated CPU core and the plurality of CPU cores.

14. The network device of claim 12, wherein the data structure comprises one or more of:
    a counter that comprises information on one or more of a number of received frames, a number of received bytes, an error condition, and an error count; and
    a fragment table that includes at least one or more fragments without any transport layer header.

15. The network device of claim 12, wherein the dedicated CPU core in the symmetric multiprocessing architecture is allocated to process only data packets received from other CPU cores in the symmetric multiprocessing architecture.

16. The network device of claim 15, a particular CPU core among the plurality of CPU cores is to:
    determine that a value needed for processing a received data packet is not available in the memory; and
    forward the received data packet to the dedicated CPU core, thereby avoid using CPU core time on waiting for the value to become available.

17. The network device of claim 15, wherein the dedicated CPU core is further to:
    receive a query corresponding to one or more of the other CPU cores;
    identify one or more memory locations in the shared memory storing data for the one or more CPU cores corresponding to the query;
    retrieve one or more data values at the identified memory locations; and
    respond to the query based on the one or more retrieved data values.

18. The network device of claim 17, wherein the dedicated CPU core is further to:
    aggregate the one or more retrieved data values to generate an aggregated data value; and
    respond to the query based on the aggregated data value.

19. The network device of claim 17, wherein the query is received from a control plane process that runs on one or more of control plane CPU cores.

20. The network device of claim 19, wherein the query is generated by either a user through a command line interface to the control plane process or generated by the control plane process.

21. The network device of claim 12, wherein the data packet comprises a parent fragment and a plurality of data fragments, and wherein session processing information is included only in the parent fragment and absent in the plurality of data fragments.

22. The network device of claim 21, wherein in response to a particular CPU core receiving a data fragment of the data packet prior to the corresponding parent fragment of the data packet, the memory stores the data fragment in the non-atomic data structure until the corresponding parent fragment of the data packet is received; and the particular CPU core continues processing the data fragment based on a transport layer header in the corresponding parent fragment.

23. A non-transitory computer-readable storage medium storing embedded instructions for a plurality of operations that are executed by one or more mechanisms implemented within a network device having a symmetric multiprocessing architecture, the plurality of operations when executed:

storing a data structure, which is specific to each of the CPU cores, in a memory shared by the plurality of CPU cores; and allocating a dedicated CPU core in the network device having the symmetric multiprocessing architecture to process only data packets received from other CPU cores in the network device having the symmetric multiprocessing architecture;

receiving, by the dedicated CPU core, a query corresponding to one or more of the other CPU cores;

retrieving, by the dedicated CPU core, one or more data values at one or more memory locations in the shared memory storing data for the one or more CPU cores corresponding to the query; and aggregating, by the dedicated CPU core, the one or more retrieved data values to generate an aggregated data value; and responding, by the dedicated CPU core, to the query based on the aggregated data value.

* * * * *